Figure 1:
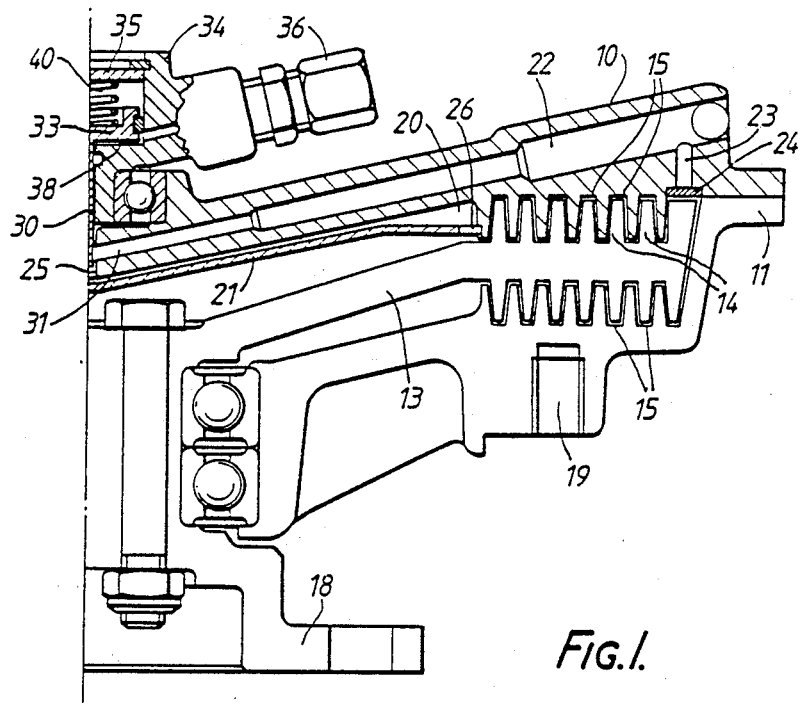

United States Patent [19]

Elmer

[11] Patent Number: 4,924,986
[45] Date of Patent: May 15, 1990

[54] VISCOUS FLUID CLUTCHES
[75] Inventor: Arthur E. H. Elmer, Nailsworth, Great Britain
[73] Assignee: Kysor Industrial Corporation, Cadillac, Mich.
[21] Appl. No.: 193,288
[22] PCT Filed: Sep. 16, 1987
[86] PCT No.: PCT/GB87/00643
  § 371 Date: May 13, 1988
  § 102(e) Date: May 13, 1988
[87] PCT Pub. No.: WO88/02075
  PCT Pub. Date: Mar. 24, 1988
[30] Foreign Application Priority Data
  Sep. 17, 1986 [GB] United Kingdom ............ 8622422
[51] Int. Cl.⁵ .................... F16D 35/00; F16D 43/25
[52] U.S. Cl. ........................ 192/58 B; 192/82 T
[58] Field of Search .............. 192/83, 58 B, 82 T

[56] References Cited

U.S. PATENT DOCUMENTS

| | | |
|---|---|---|
| 2,714,946 | 8/1955 | Tenot et al. |
| 3,404,832 | 10/1968 | Sutaruk ............. 192/58 B X |
| 3,444,748 | 5/1969 | Sutaruk ............. 192/58 B X |
| 3,893,555 | 7/1975 | Elmer ............... 192/58 B |
| 3,972,399 | 8/1976 | Bopp ................ 192/58 B |
| 4,134,484 | 1/1979 | Lansinger ........... 192/58 B |
| 4,189,095 | 2/1980 | Monigold et al. .... 192/82 T X |
| 4,351,425 | 9/1982 | Bopp ................ 192/82 T X |
| 4,362,226 | 12/1982 | Gee ................. 192/82 T X |
| 4,403,757 | 9/1983 | Shepherd ............ 192/58 B |
| 4,570,771 | 2/1986 | Yamaguchi et al. .... 192/58 B |
| 4,591,037 | 5/1986 | Bopp ................ 192/58 B |
| 4,597,481 | 1/1986 | Muller et al. ....... 192/82 T X |
| 4,727,969 | 3/1988 | Hayashi et al. ...... 192/58 B |

FOREIGN PATENT DOCUMENTS

| | | |
|---|---|---|
| 0055854 | 7/1982 | European Pat. Off. . |
| 0061280 | 9/1982 | European Pat. Off. . |
| 1284188 | 11/1968 | Fed. Rep. of Germany . |
| 3242381 | 6/1983 | Fed. Rep. of Germany . |
| 2176434 | 10/1973 | France . |
| 2353736 | 12/1977 | France . |
| 2492925 | 4/1982 | France . |
| 2071283 | 9/1981 | United Kingdom . |
| 2099960 | 12/1982 | United Kingdom . |

Primary Examiner—Rodney H. Bonck
Attorney, Agent, or Firm—Price, Heneveld, Cooper, DeWitt & Litton

[57] ABSTRACT

The invention relates to a viscous fluid variable drive to a rotary cooling fan for an engine, the drive being automatically controlled in response to sensed parameters such as temperature. In one example the drive unit includes an inner drive member 14 within a casing 10, 11 which includes a pump 24 continuously delivering fluid from the gap to a central valve port 25 when the fluid returns to a reservoir 20 and then spills through an aperture 26 back into the clearance gap. The valve port 25 in the supply passage from the pump is automatically controlled by a valve 30 actuated by compressed air in a line 36 from a remote thermal sensing unit. In another embodiment the valve 30 is controlled by a bi-metal strip 46 sensitive to ambient air. The pressure from the pump may also be used to actuate a servo valve 61 controlling the return flow of fluid from the reservoir 20 to the clearance gap. The valve may be in two separate units controlled spearately by valve elements 101 and 30'''.

8 Claims, 2 Drawing Sheets

VISCOUS FLUID CLUTCHES

This invention relates to rotary clutches or torsional transmission devices of the type having a rotary casing with an internal rotary element between which is provided a small annular clearance gap. When this gap is occupied by viscous fluid torque can be transmitted between the two parts and the amount of torque can be varied by adjusting the amount of fluid in the gap.

It has been proposed to adjust the amount of fluid in the gap by providing an automatic fluid impeller acting between the two parts and arranged to convey the fluid from the outer periphery of the gap inwards to a fluid chamber or reservoir from which the fluid then returns outwards towards the gap. By adjusting the rate of circulation of the fluid the volume in the gap can be adjusted.

Existing designs of this type suffer from various disadvantages. They tend to be slow acting and the need to accommodate considerable volumes of fluid in the reservoir tends to increase the overall dimensions and weight of the clutch. Accordingly it is an object of the invention to provide an improved rotary clutch or transmission device of the kind referred to which will avoid some of the existing difficulties.

Broadly stated the invention consists in a viscous fluid clutch or torsional drive comprising a rotary casing containing an internal rotary element defining an annular clearance gap, a fluid reservoir adjacent the rotary axis having a fluid exit aperture communicating with the clearance gap, and a pump for impelling fluid radially inwards from the outer periphery of the gap into the reservoir.

According to a preferred feature of the invention the unit includes a valve arranged to close or restrict the pressure line from the pump to the reservoir. The valve may act directly to close or restrict the flow line to the reservoir from the pump. Alternatively there may be a servo-operated valve responsive to the increase in pressure when the aforementioned valve is closed. The servo-valve is preferably arranged to open the or an exit from the reservoir.

In any case the valve is preferably arranged to prevent reverse flow through the pump when the pump is inoperative or less effective at low speeds.

According to another preferred feature of the invention there is a permanently open outlet from the reservoir.

In one particularly preferred construction, there are two separate reservoirs each controlled by a respective valve in a pressure line from the pump, and the two reservoirs may be associated respectively with dual control valves controlling the discharge of fluid from the reservoir to the clearance gap. Preferably one of the two valves has a thermal sensing element responsive to ambient air temperature and the other valve has a remote operated coolant temperature sensing system.

Figure 2:
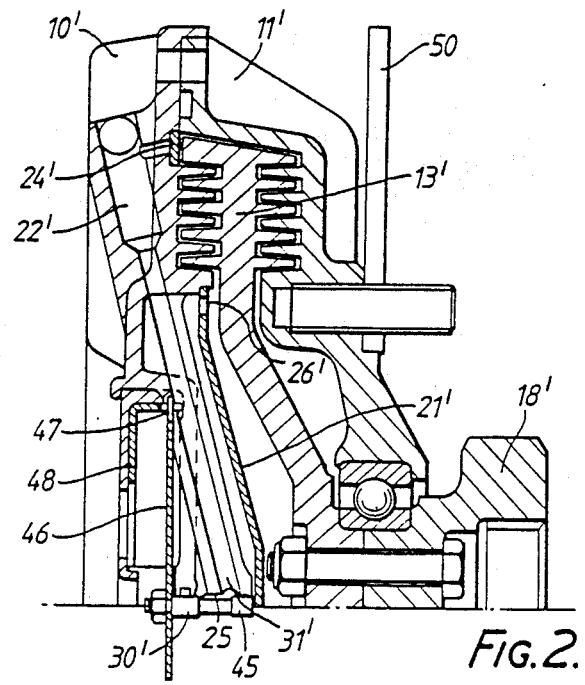
Figure 3:
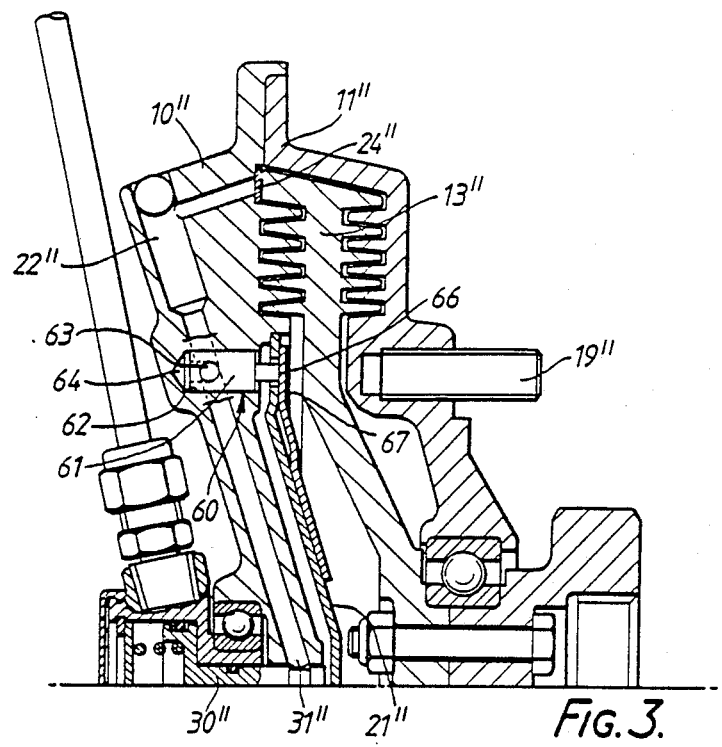
Figure 4:
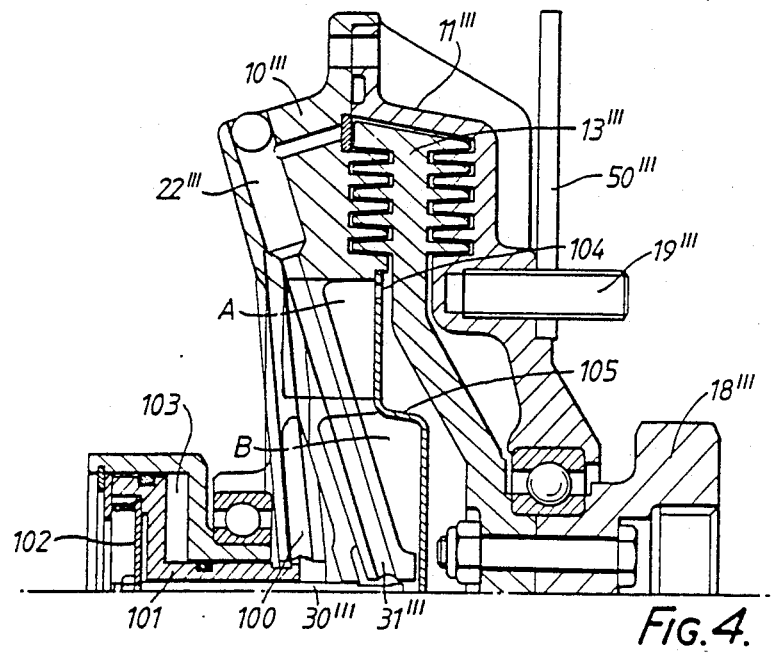

The invention may be performed in various ways and a number of embodiments will now be described by way of example with reference to the accompanying drawings, in which:

FIG. 1 is a half-sectional side elevation through a viscous fluid clutch according to the invention, and FIGS. 2, 3 and 4 are also sectional half elevations through other embodiments of the invention.

In the embodiment of FIG. 1 the viscous clutch comprises a rotary casing formed by two main shells 10,11 bolted together and providing an internal annular chamber in which is received an inner rotary element 13 which has a plurality of annular ribs 14 on its opposite faces extending into corresponding grooves 15 formed in the two shells 10,11. This arrangement provides a labyrinth annular clearance gap between the casing and the inner member 13 and when occupied by a viscous fluid torsion is transmitted in known manner between the two rotary members. The internal member 13 is secured to a drive flange 18 intended to be bolted to a drive shaft, not shown, and the casing shell 11 has bolt fixings 19 by which it can be secured, for example, to an output shaft or to a cooling fan or other power absorber.

Means are provided for varying the quantity of the viscous fluid present in the annular clearance gap so as to control or adjust the torsional transmission. For this purpose an annular reservoir 20 is provided between the shell 10 and an internal partition wall 21, and a radial pressure line 22 is formed in the shell 10 having an inlet 23 from a scoop type pump 24 and an outlet port 25 leading to a central axial passage which leads on to the central part of the reservoir 20. Thus so long as the exit port 25 is open any relative rotation between the inner member 13 and the casing will cause a pumping action at the scoops 24 and fluid will be pumped out of the clearance gap into the reservoir thus reducing the torsional drive. There is a permanently open small bleed port 26 at the radially outer edge of the partition 21 which allows fluid to drain continuously at a low rate back into the clearance gap.

The unit also includes a valve controlling the flow of fluid along the radial supply passage 22 from the pump 24. For this purpose there is a valve plunger 30 positioned centrally in the passage 25, the bottom end of the plunger being arranged to open and close the port 31 at the inner end of the passage 22. The plunger is attached to a piston 33 positioned in a non-rotating cylinder 34 the outer end of this cylinder being closed by a wall 35 and a remote operated compressed air line 36 communicates with the volume 38 at the underside of the piston 33 such that when compressed air is admitted at 36 the piston is raised to open the port 31. When the air pressure at 36 falls a spring 40 acts downwards on the piston causing the port 31 to be closed. Supply of air to the pressure line 36 may be from a remotely positioned thermal control valve located, for example, in the coolant circuit of an engine which is arranged to drive the flange 18 and has a radiator supplied with air by a fan bolted to the casing at 19.

Thus if the sensed temperature of the coolant for the engine falls the thermal control valve automatically opens to admit compressed air to the line 36, which causes the valve 30,31 to open allowing fluid to flow into the reservoir 20. In these conditions the pumping rate at 24 is greater than the return flow rate at 26 and the annular clearance gap is progressively drained of fluid thus reducing the quantity of fluid in the clearance gap which, in turn, reduces the torsional transmission. The casing and the cooling fan blades attached to it therefore slows down, the cooling effect is reduced and it is t be expected that the coolant temperature will then progressively rise.

Contrarily when the coolant temperature rises above a predetermined level the supply of air to the line 36 is cut off and the opposite effect occurs. This results in automatic temperature control of the clutch so as to maintain a substantially constant coolant temperature.

In the alternative embodiment of FIG. 2 many of the essential components are similar or perform the same function and like parts are indicated by the same reference numerals with a suffix.

This embodiment differs primarily in the means controlling the flow of fluid from the radial pressure line 22 to the reservoir 20. As in the previous embodiment there is a valve plunger 30' positioned in a bore 25 and having a land 45 controlling a port 31' at the inner end of the pressure line 22. In this case the valve plunger 30' is connected to a bi-metal strip 46 whose opposite end is attached at 47 to a part 48 fixed in position at the front end of the casing 10 and thus exposed to the flow of air passing over the clutch and over the fan blade ring 50. In this case the internal valve is actuated directly in response to changes in the air temperature and with the fan positioned downstream of the coolant radiator this provides automatic control of coolant temperature.

The embodiment illustrated in FIG. 3, is in some respects similar to that of the first example and again like parts are indicated by the same reference numerals with a double suffix. In this case there is an additional servo-valve indicated generally at 60 positioned in the front casing 10 and having a plunger 61 movable in a bore 62 and having a port 63 communicating with the pressure line 22" so a to supply the same pressure fluid to a space 64 at the end of the bore. The other end of the plunger 61 is connected to a movable valve flap 66 secured to the internal partition 21" and arranged to open and close a return port 67. The port 31" at the inner end of the pressure line 22" is opened and closed automatically by the valve plunger 30", as in the first example, and when the port is closed the pumping effect of the scoops 24" causes the pressure in the line 22" to rise and this causes servo-valve 61 to shift to the right thus opening the flap valve 66 which allows fluid to flow back from the reservoir 20" into the clearance volume.

The embodiment illustrated in FIG. 4 is in some respects similar to a combination of the embodiments of FIGS. 1 and 3. In this example the shell member 10''' and the partition 21''' are formed to provide two separate radially spaced reservoirs A and B. There are two separate pumping systems arranged to pump fluid from the outer periphery of the clearance volume into the reservoirs. The radial passage 22''', as in the first example, supplies fluid to the port 31''' controlled by the central valve plunger 30''' and this fluid flows into the inner reservoir B. The other pumping system with a radial pressure line 100 is controlled by a valve sleeve 101 and this supplies pumped pressure fluid to the outer reservoir A. The inner valve spindle 30''' is controlled by a bi-metal strip 102 sensitive to local air temperature while the valve sleeve 101 is controlled by a remote thermal sensed valve admitting compressed air to the annular space 103 similar to the FIG. 3 embodiment.

The two reservoirs A and B each have a permanently open exit 104,105 allowing fluid to flow outwards into the clearance gap and in this way the two valves and reservoirs act in concert to adjust the flow rate and hence the volume of fluid in the clearance gap and the torsional drive potential.

I claim:

1. A viscous fluid shear clutch comprising a rotary casing containing an internal rotary element defining an annular clearance gap for transmitting torsional drive between said casing and said rotary element by shear force, a fluid reservoir adjacent the rotary axis having a fluid exit aperture communicating with the clearance gap, a pump for impelling fluid radially inwards from the outer periphery of the gap into the reservoir, a supply valve arranged to close or restrict the fluid path from the pump to the reservoir so as to vary the quantity of fluid in the gap and a servo-operated valve arranged to open a fluid exit from the reservoir to the clearance gap, and responsive to the increase in pressure in said fluid path when the aforementioned supply valve is closed.

2. A clutch according to claim 1, wherein said supply valve is operable progressively to restrict the fluid path from the pump to the reservoir.

3. A clutch according to claim 1 in which the supply valve acts directly to close or restrict the flow line to the reservoir from the pump.

4. A viscous fluid clutch or torsional drive comprising a rotary casing containing an internal rotary element defining an annular clearance gap, a fluid reservoir adjacent the rotary axis having a fluid exit aperture communicating with the clearance gap, a pump for impelling fluid radially inwards from the outer periphery of the gap into the reservoir, and a supply valve arranged to close or restrict the fluid path from the pump to the reservoir so as to vary the quantity of fluid in the gap, and a servo-operated valve arranged to open a fluid exit from the reservoir to the clearance gap and being responsive to the increase in pressure in said fluid path when the aforementioned supply valve is closed.

5. A viscous fluid clutch or torsional drive comprising a rotary casing containing an internal rotary element defining an annular clearance gap, a fluid reservoir adjacent the rotary axis having a permanently open fluid exit aperture communicating with the clearance gap, a pump at the outer periphery of the casing for impelling fluid radially inwards from the outer periphery of the gap into the reservoir, and a supply valve responsive to a temperature-dependent pressure force and arranged to progressively restrict the fluid path from the pump to the reservoir, so as to vary the quantity of fluid in the gap, said supply valve being arranged adjacent the rotary axis and comprising a single valve aperture means and a valve member movable progressively to close said valve aperture means.

6. A viscous fluid shear clutch comprising a rotary casing containing an internal rotary element defining an annular clearance gap for transmitting torsional drive between said casing and said rotary element by shear forces, a fluid reservoir adjacent the rotary axis having a fluid exit aperture communicating with the clearance gap, pump means for impelling fluid radially inwards from the outer periphery of the gap into the reservoir, and supply valve means arranged to close or restrict at least two fluid paths from the pump means to the reservoir, in which the said supply valve means is controlled in a continuously variable manner in response to variations in the different operating parameters to vary the flow through a respective fluid path from the pump to the reservoir.

7. A clutch or drive according to claim 6, in which the valve means includes a first thermal sensing element responsive to ambient air temperature, and a second sensing element responsive to coolant temperature.

8. A clutch or drive according to claim 7, in which the valve means incorporates two separate valve operating elements connected respectively to the two temperature sensing elements.

* * * * *

UNITED STATES PATENT AND TRADEMARK OFFICE
CERTIFICATE OF CORRECTION

PATENT NO.    : 4,924,986
DATED         : May 15, 1990
INVENTOR(S)   : Arthur E.H. Elmer It is certified that error appears in the above-identified patent and that said Letters Patent is hereby corrected as shown below: Title page:

Abstract, line 7;
    "when" should be -- whence --;

Abstract, line 16;
    "tbe" should be -- the --;

Abstract, line 19;
    "spearately" should be -- separately --;

Column 2, line 62;
    "t be" should be -- to be --;

Column 3, line 26;
    "a to" should be -- as to --;

Column 4, Claim 6, line 57;
    "in the" should be -- in two --.

Signed and Sealed this

Tenth Day of March, 1992

*Attest:*

HARRY F. MANBECK, JR.

*Attesting Officer*      *Commissioner of Patents and Trademarks*